United States Patent [19]
Thomas

[11] Patent Number: 5,860,318
[45] Date of Patent: Jan. 19, 1999

[54] STROKE ADJUSTMENT DEVICE FOR PICKLING MACHINES

[75] Inventor: Manfred Thomas, Versmold, Germany

[73] Assignee: Schröder Maschinenbau GmbH, Germany

[21] Appl. No.: 686,547

[22] Filed: Jul. 26, 1996

[30] Foreign Application Priority Data

Aug. 16, 1995 [DE] Germany ............... 195 30 044.0

[51] Int. Cl.⁶ ................ A23B 4/28; F16H 21/32
[52] U.S. Cl. .............. 74/40; 99/533; 99/535; 74/600
[58] Field of Search ............... 74/40, 600, 45, 74/51; 99/533, 535; 426/281, 264

[56] References Cited

U.S. PATENT DOCUMENTS

| 241,544 | 5/1881 | Kearney et al. | 74/522 |
|---|---|---|---|
| 432,696 | 7/1890 | Witt | 74/522 |
| 1,050,213 | 1/1913 | Hall | 74/833 |
| 1,315,242 | 9/1919 | Servatius | 99/533 |
| 2,271,771 | 2/1942 | Klocke | 74/522 |
| 2,467,677 | 4/1949 | Hermite | 74/40 |
| 3,274,860 | 9/1966 | Gauthier et al. | 74/40 |
| 4,903,590 | 2/1990 | Muller et al. | 99/533 X |
| 5,272,964 | 12/1993 | Ostergaard | 99/533 |

FOREIGN PATENT DOCUMENTS

| 1309997 | 10/1962 | France | 74/340 |
|---|---|---|---|
| 141870 | 6/1903 | Germany | 74/600 |
| 3716802 | 7/1988 | Germany . | |

*Primary Examiner*—Rodney H. Bonck
*Assistant Examiner*—William C Joyce
*Attorney, Agent, or Firm*—Rothwell, Figg, Ernst & Kurz, p.c.

[57] ABSTRACT

Device for the adjustment of the stroke length of a needle carrier (12) of a pickling machine, which can be moved back and forth in such a way that the lower deadpoint of the needle carrier is independent of the stroke length, is characterized by the fact that needle carrier (12) is articulated with an intermediate lever (24) that can be turned around a rigid axis (26) and this lever (24) is joined in turn via a connecting rod (22) with a crankshaft (18) driven in rotation, and that coupling point (32) of connecting rod (22) on intermediate lever (24) can be adjusted in a connecting link (34), which runs concentric to the axis of rotation of crankshaft (18) in the lower dead-point position of intermediate lever (24).

4 Claims, 3 Drawing Sheets

STROKE ADJUSTMENT DEVICE FOR PICKLING MACHINES

DESCRIPTION

The invention concerns a device for adjusting the stroke length of a needle carrier, which can be moved back and forth, of a pickling machine.

A pickling machine is described in DE 3,716,802, which serves for injecting pickling brine into the goods to be pickled by means of a number of needles. The needles are arranged on a needle carrier, which is arranged so that it moves vertically over a conveyor for the pickling goods. After the pickling goods have been introduced onto the conveyor, the needle carrier is lowered so that the needles can penetrate into the pickling goods. A lower holder that can be moved relative to the needle carrier is first lowered together with the needle carrier and then arrives in position on the upper side of the pickling goods, so that it falls short relative to the needle carrier. The relative motion between lower holder and needle carrier serves for controlling valves for the input of brine, so that the brine is released from the needles only if they have penetrated into the meat. In the subsequent upward motion of the needle carrier, the lower holder serves for the purpose of removing the pickling goods from the needles. If the needles are retracted from the pickling goods, and the lower holder has been lifted off again from the pickling goods, the conveyor is placed in operation for a brief time, so that the now pickled goods can be transported off and new pickling goods are introduced. In this way, a new pickling cycle can begin.

The needle carrier in each working cycle must be lowered so far that the needles completely penetrate into the pickling goods, thus reaching up close to the conveyor, and it must then be raised far enough again that the pickling goods that are introduced and then transported off can freely pass under the lower ends of the needles. The stroke length must thus be selected in correspondence with the maximal thickness of the pickling goods to be processed.

If thinner pickling goods are processed, it is desirable to reduce the stroke length of the needle carrier and thus a large proportion of the total cycle time can be utilized for the injection of the brine into the pickling goods, and unnecessarily long empty strokes of the needle carrier are avoided.

In the pickling machine described in the above-named publication, the needle carrier is driven hydraulically, and the adjustment of stroke length is accomplished by a suitable hydraulic control in such a way that the lower dead point of the needle carrier always remains unchanged, whereas the upper dead point varies corresponding to the thickness of the pickling goods to be processed.

The use of a hydraulic drive for the needle carrier, however, has various disadvantages, particularly in pickling machines that are designed for a high processing capacity and are correspondingly large and heavy. Included in these disadvantages is a relatively large construction cost, high wear, high energy consumption, and a relatively low working speed.

The object of the invention is thus to create a device for adjusting the stroke length for pickling machines with a mechanically driven needle carrier, in which the lower dead point of the needle carrier, i.e., the dead point at which the needles have penetrated the pickling goods, is independent of the stroke length.

This object is resolved according to the invention with the features given in the independent patent claims 1 and 2.

According to the invention, the needle carrier is driven mechanically by means of an intermediate lever, which is coupled to a rotationally driven crankshaft by means of a connecting rod. In the solution according to claim 1, the coupling point of the connecting rod in the intermediate lever can be adjusted along a guide. By adjusting this coupling point along the guide, the lever arm with which the connecting rod engages the intermediate lever is changed, and thus the angular range in which the intermediate lever is turned with one rotation of the crankshaft is also changed. Consequently the stroke length of the needle carrier articulated with the intermediate lever also changes. The guide is thus arranged on the intermediate lever such that it describes an arc of a circle concentric to the rotational axis of the crankshaft, if the intermediate lever is found in a position that corresponds to the lower dead-point position of the needle carrier. If the coupling point of the connecting rod is adjusted along this guide, the lower dead-point position thus does not change, but only a slight change of the crank angle occurs, at which the intermediate lever reaches the lower dead-point position.

In the solution according to claim 2, the rotating motion of the intermediate lever is transferred to the needle carrier via a transmission link and the engagement point of the transmission link on the intermediate lever can be adjusted by a guide, which runs essentially at a right angle to the stroke direction of the needle carrier in the lower dead-point position. In this solution, the intermediate lever is turned by means of the crankshaft and the connecting rod always at the same angle, and instead of varying this angle, the length of the lever arm, by means of which the intermediate lever is engaged on the transmission link, is changed. Since the guide runs at a right angle to the stroke direction of the needle carrier in the lower dead-point position, the lower dead-point position of the needle carrier remains unchanged, if the transmission link is adjusted along the guide.

Advantageous embodiments of the invention result from the subclaims.

A preferred example of embodiment will be explained in more detail below on the basis of the drawing.

Here:

Figure 2:
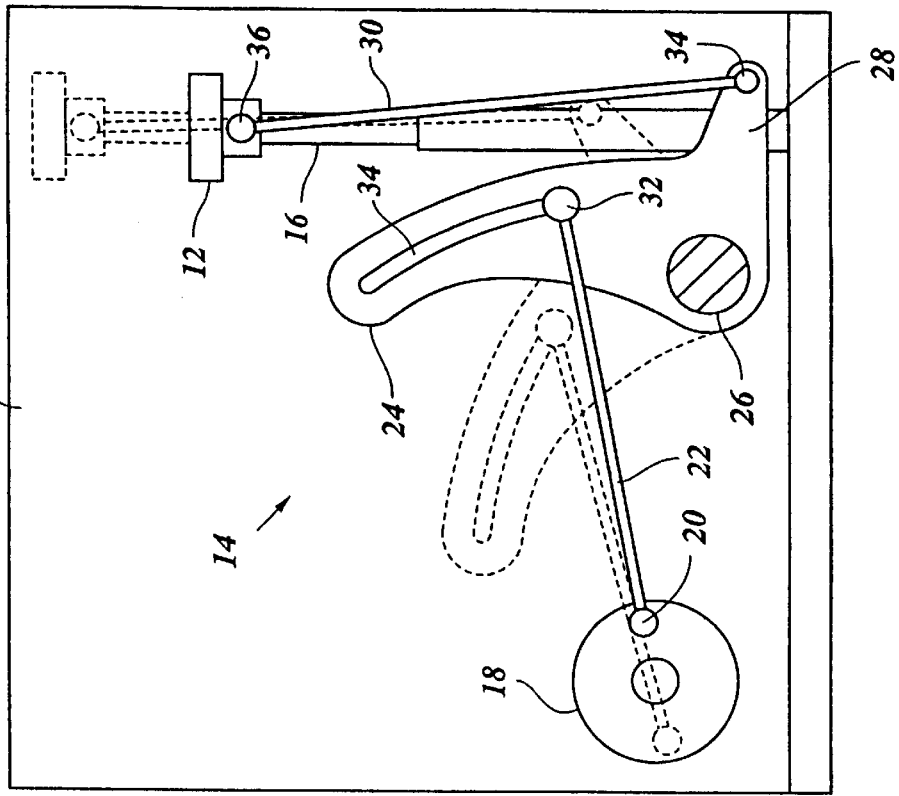
FIG. 2 shows the drive mechanism according to FIG. 1 in the adjustment that corresponds to a maximum stroke length

In the drawing, only the parts within a pickling machine 1 essential for explaining the invention are shown, i.e., a mount 10, a needle carrier 12, and a drive mechanism 14 for the carrier.

Needle carrier 12 extends in the direction perpendicular to the plane of the drawing like a bridge over a conveyor (not shown), on which the pickling goods are introduced, and is held and guided by its opposite ends, which can be moved vertically on two telescopic columns 16 fastened to the mount. Only the telescopic column 16 on the drive side is shown in the drawing.

Drive mechanism 14 has a crankshaft 18, which is driven by an electrical motor with adjustable rpm (not shown), and whose eccentric crank pin 20 is coupled with an intermediate lever 24 by means of a connecting rod 22. Intermediate lever 24 is shaped as an elbow lever in the example shown and can be rotated around an axis 26 rigid on the mount. Connecting rod 22 is engaged on the longer lever arm of intermediate lever 24, whereas the free end of the shorter lever arm 28 is joined with needle carrier 12 by means of a joint rod 30.

Figure 1:
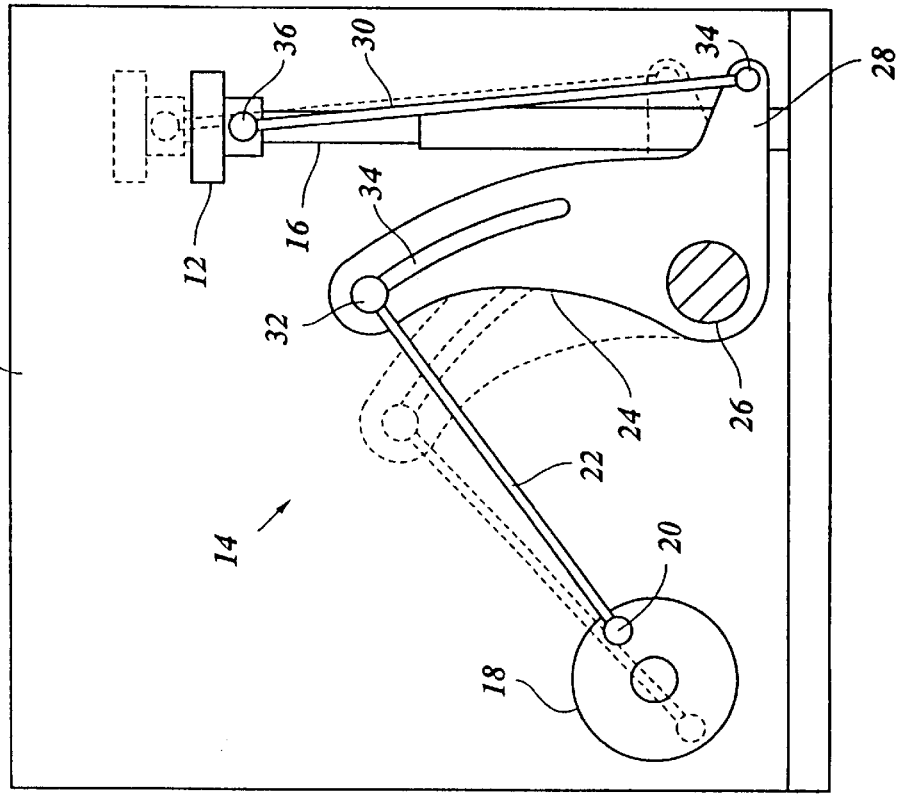
FIG. 1 shows a schematic view of a drive mechanism for the needle in a pickling machine in the adjustment that corresponds to a minimum stroke length.

Needle carrier 12 and drive mechanism 14 are shown in FIG. 1 by the solid line in the lower dead-point position, in which the needles (not shown) sitting on needle carrier 12 penetrate into the pickling goods and reach almost right up to the surface of the conveyor. With further rotation of crankshaft 18, intermediate lever 24 is turned in the counter-clockwise direction, and needle carrier 12 is raised, until the upper dead-point position, which is shown by the dashes, is reached after one crankshaft rotation of 180°.

Connecting rod 22 is joined with intermediate lever 24 at a coupling point 32 by means of a joint, which can be adjusted in a slot-shaped connecting link 34 of the intermediate lever serving as a guide, and can be attached in the desired position each time on the intermediate lever by means of a clamping jaw mechanism or the like. Connecting link 34 runs approximately radially with respect to axis 26 and describes an arc of a circle around the axis of rotation of crankshaft 18 in the lower dead-point position of elbow lever 24. Coupling point 32 at the outer end of connecting link 34 is applied in FIG. 1 such that connecting rod 22 is engaged on intermediate lever 24 by means of a long lever arm. Consequently, the turning range of intermediate lever 24 and the stroke length of needle carrier 12 are relatively small.

On the other hand, in FIG. 2, coupling point 32 is found at the end of connecting link 34, which is applied closely to axis 26, so that a larger rotating range of intermediate lever 24 and consequently a greater stroke length of needle carrier 12 results upon rotation of crank shaft 18. Based on the changed position of coupling point 32, the lower dead point in FIG. 2 is reached at a somewhat different crank angle than in FIG. 1. On the other hand, the lower dead-point position of intermediate lever 24 in FIG. 2 is the same as in FIG. 1. The same is also true for all of the intermediate positions of coupling point 32 in connecting link 34. Therefore, the stroke length of needle carrier 12 can be varied continuously by suitable adjustment of coupling point 32, whereby the lower reversal point always remains in the same position with respect to the conveyor (not shown) and only the height of the upper reversing point is changed.

If relatively thick pieces of meat are to be pickled, then the adjustment according to FIG. 2 is selected, so that the needle carrier is raised way up after injecting the pickling brine, and the transport of the pickling goods is not hindered. If flatter pieces of meat are to be used as the pickling goods to be processed, then a smaller stroke length, for example, the minimum stroke length is adjusted according to FIG. 1, so that the needle carrier and the needles are raised to a lesser extent. In this way, the crank angle range for which the needles are inserted into the pickling goods is enlarged, so that a larger proportion of the cycling time can be utilized for the injection of the pickling brine. Therefore it is possible to increase the rpm of crankshaft 18, so that a higher processing speed is obtained, but a sufficient quantity of pickling brine is still injected into the pickling goods.

Since the masses that are moved for the adjustment according to FIG. 1, particularly needle carrier 12 and elbow lever 24, travel only relatively short distances, despite the increased rpm of the drive shaft, a relatively small power consumption of the drive motor results, and the reaction forces taken up by mount 10 remain within supportable limits. By introducing a suitable centrifugal mass on crankshaft 18, the drive mechanism can be extensively balanced, and the necessary torque of the drive motor can be further reduced. Based on the shorter path with the adjustment according to FIG. 1, over and above this, there results a smaller wear on the moving parts, so that the service life of the pickling machine is increased.

The configuration of the intermediate lever as an elbow lever permits a compact arrangement of drive mechanism 14 in the underframe of the pickling machine. However, arrangements are also conceivable, in which intermediate lever 24 is an essentially linear lever. In this case, connecting rod 22 and joint rod 30 also can be selectively applied to the same side of axis 26 on the intermediate lever.

Figure 3:
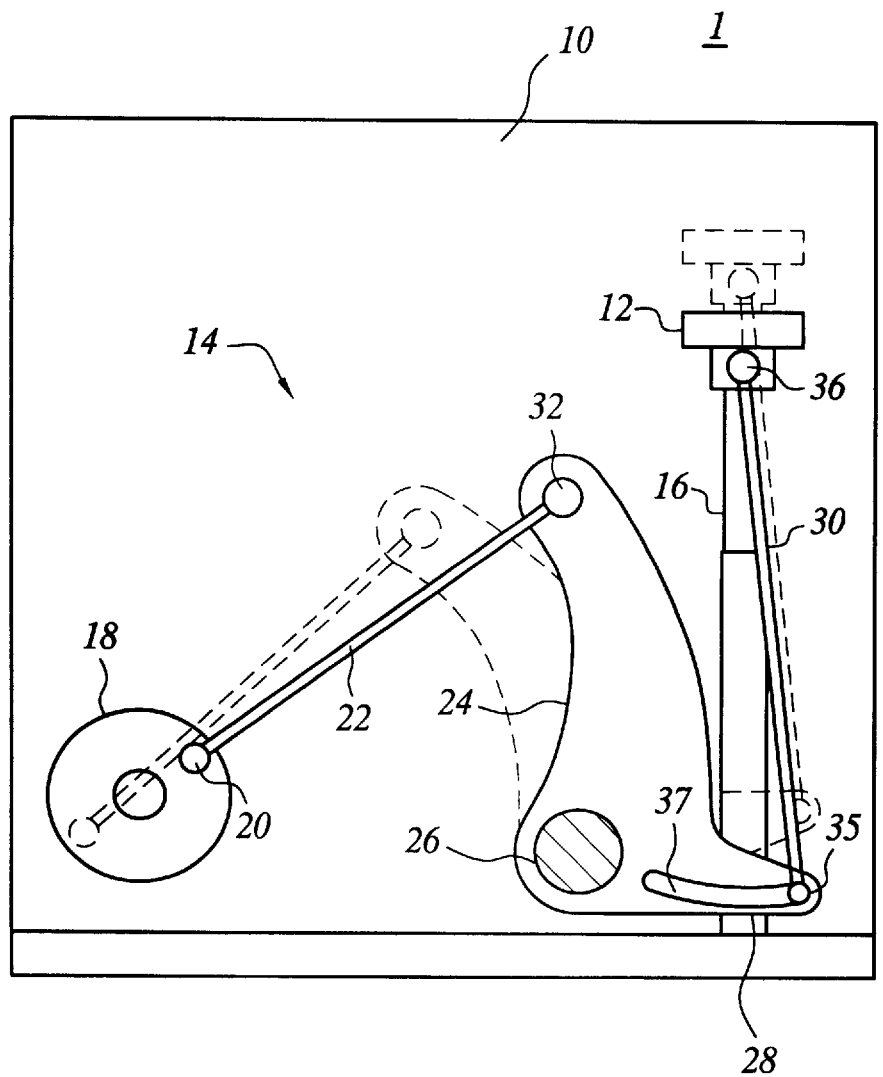
FIG. 3 is a schematic view of a second embodiment of the present invention.
Figure 4:
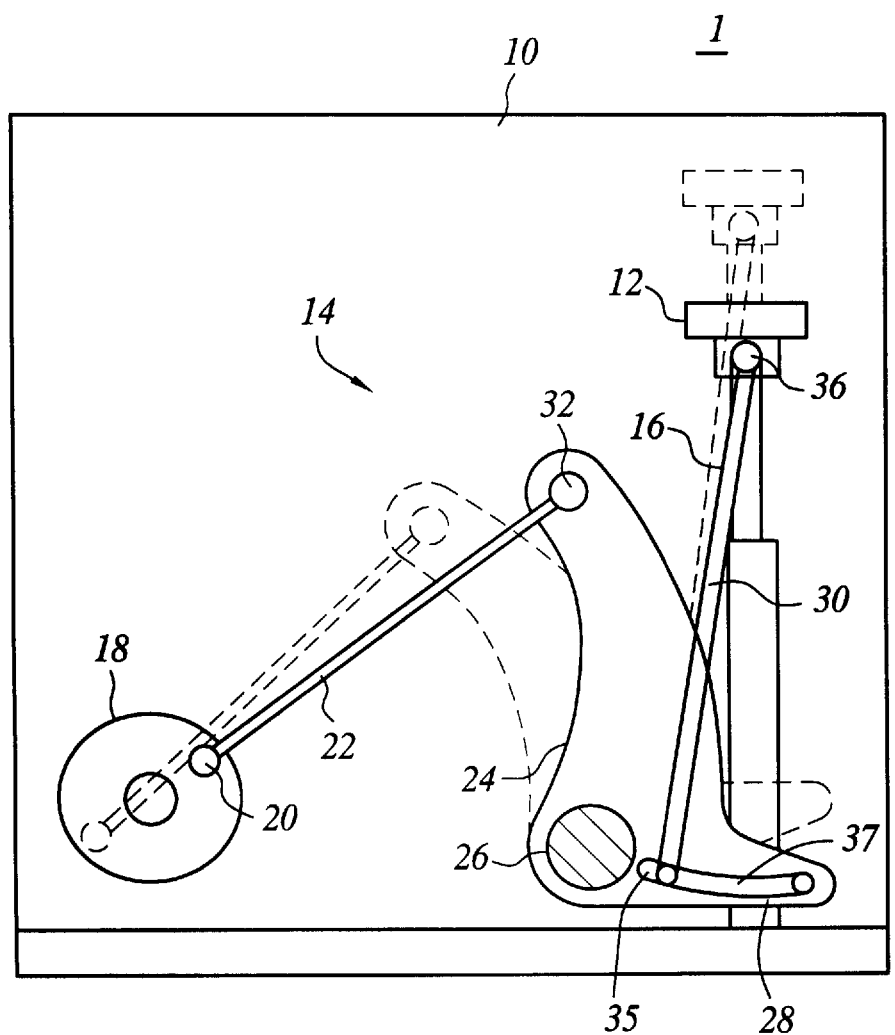
FIG. 4 shows the drive mechanism according to FIG. 3 in the adjustment that corresponds to maximum stroke length.

The above-described functional principle can be extensively modified as illustrated in FIGS. 3 and 4, such that the adjustment of the stroke length occurs not between connecting rod 22 and intermediate lever 24, but rather between intermediate lever 24 and joint rod 30. In this case, the lower coupling point 35 of joint rod 30 can be adjusted in a connecting link of lever arm 28 in a guide 37, which describes an arc of a circle around the upper coupling point 36 of joint rod 30 in the lower dead-point position. This connecting link then runs essentially perpendicular to the (vertical) direction of motion of needle carrier 12 in the lower dead-point position.

Instead of joint rod 30 as the transmission link between intermediate lever 24 and needle carrier 12, a driver may also be provided as desired, which is joined rigidly with needle carrier 12 and engages in a suitable connecting link of the intermediate lever. The adjustment of stroke height can then be effected in the same way as in FIGS. 1 and 2 or as desired, due to the fact that the driver is adjusted relative to needle carrier 12 in the horizontal direction, thus perpendicular to its direction of motion. The driver then engages in a relatively long linear connecting link of intermediate connecting lever 24, which runs horizontally in the lower dead-point position, thus perpendicular to the direction of motion of needle carrier 12.

I claim:

1. A pickling machine comprising a stroke adjustment device for adjustment of a stroke length of a needle carrier (12) of the pickling machine, which can be moved back and forth in such a way that a lower dead-point position of the needle carrier is independent of the stroke length, is characterized by the fact that needle carrier (12) is articulated with an intermediate lever (24), which can be turned around a rigid axis (26), and said intermediate lever (24) is joined in turn by means of a connecting rod (22) with a crankshaft (18) driven in rotation, and that a coupling point (32) of connecting rod (22) can be adjusted on intermediate lever (24) in a guide (34), which runs concentrically to the axis of rotation of crankshaft (18) in the position of intermediate lever (24) corresponding to the lower dead-point position of the needle carrier (12).

2. A pickling machine comprising a stroke adjustment device for adjustment of a stroke length of a needle carrier (12) of the pickling machine, which can be moved back and forth in such a way that a lower dead-point position of the needle carrier is independent of the stroke length, is characterized in that needle carrier (12) is joined by means of a transmission link (30) with an intermediate elbow lever (24), which can be rotated around a solid axis (26) said elbow lever having a first arm and a second arm, said transmission link being connected to said first arm of said intermediate elbow lever and said second arm of said intermediate lever

(24) is joined in turn via a connecting rod (22) with a crankshaft (18) driven in rotation, and that coupling point (35) of transmission link (30) is adjustable on said intermediate elbow lever (24) in a guide (37) formed in said first arm of said intermediate elbow lever, said guide running essentially at a right angle to the direction of motion of needle carrier (12), in the position of said intermediate elbow lever (24) corresponding to the lower dead-point position of the needle carrier (12).

3. Device according to claim 2, further characterized in that the transmission link is a joint rod (30) connected in an articulating manner with needle carrier (12) and intermediate lever (24), and that the connecting link of intermediate lever (24) describes an arc of a circle around coupling point (36) of the joint rod on needle carrier (12) in the lower dead-point position.

4. Device according to one of the preceding Claims, further characterized in that intermediate lever (24) is an elbow lever.

* * * * *